L. FRANCISCO.
SEED-DROPPER.
No. 186,670.  Patented Jan. 30, 1877.
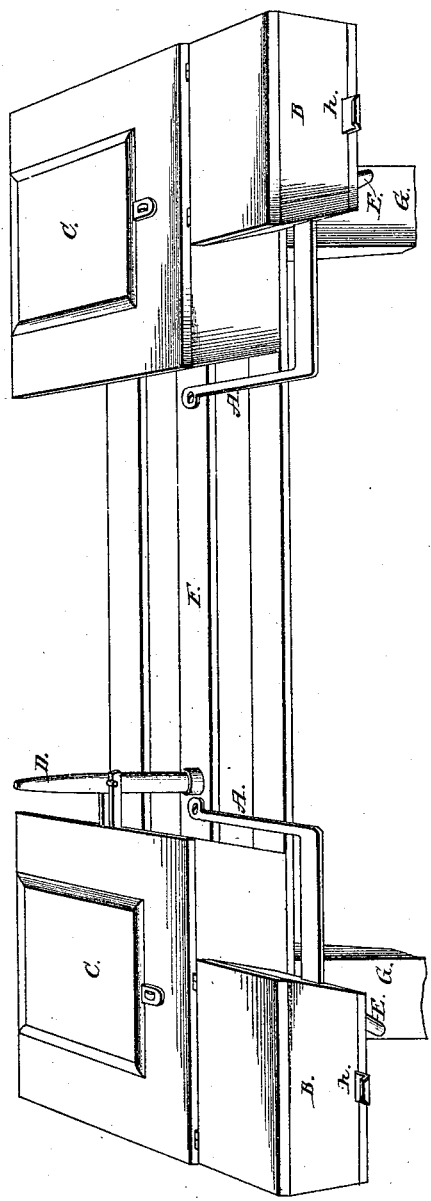
Attest:
P. K. Granger
E. Eldridge
Inventor:
Lucian Francisco

UNITED STATES PATENT OFFICE.

LUCIEN FRANCISCO, OF McHENRY, ILLINOIS.

IMPROVEMENT IN SEED-DROPPERS.

Specification forming part of Letters Patent No. 186,670, dated January 30, 1877; application filed April 24, 1876.

*To all whom it may concern:*

Be it known that I, LUCIEN FRANCISCO, of the town of McHenry, county of McHenry, and State of Illinois, have invented a new and useful Improvement in Pumpkin-Seed Droppers, which improvement is fully set forth in the accompanying drawings.

The object of my invention is to drop or plant pumpkin-seeds by an attachment to horse-power corn-planters at the same time that the corn is dropped or planted.

The accompanying drawing represents a perspective of a corn-planter with my pumpkin-seed dropper attached.

C C represent corn boxes or hoppers of corn-planter; G G, shoes of corn-planter; B B, small removable boxes or hoppers representing the pumpkin-seed boxes; E E, tubes beneath, connecting the seed-boxes with the corn-shoes G G, conducting the pumpkin-seeds to corn-shoes G G, down which they pass in company with the corn, and are together deposited and covered by the action of corn-planter. A A are iron arms, bolted to slide or dropping bar F of corn-planter. They are the feed or dropping bars of the pumpkin-seed dropper; a hole in the interior end of each dropping-bar A A in seed-boxes B B being of size sufficient to receive one or two pumpkin-seeds at a time, and, by action of lever D on bar F, draws dropping-bars A A with seeds over the mouth of tubes E E, allowing the seeds to drop into shoes G G, and thence into ground; *h h*, slotted slide attached to seed-boxes B B, used to shut off the seeds in one or both boxes from the feed-bar, so as to omit dropping in any row or rows at option of operator.

I claim as my invention—

In combination with the corn-boxes C, the boxes B attached thereto, slide F, bent arms A, that drop the pumpkin-seeds from the boxes B, tubes E, and shoes G, whereby both the corn and pumpkin-seed are dropped together in the same hill, substantially as shown.

LUCIEN FRANCISCO.

Witnesses:
F. K. GRANGER,
C. ELDREGE.